(12) United States Patent
Clarke

(10) Patent No.: US 6,726,873 B1
(45) Date of Patent: Apr. 27, 2004

(54) THERMOFORMING OR BLOW MOULDING OF INJECTION MOULDED PREFORMS

(75) Inventor: Peter Reginald Clarke, Petworth (GB)

(73) Assignee: Coraltech Limited, Petersfield (GB)

(*) Notice: Subject to any disclaimer, the term of this patent is extended or adjusted under 35 U.S.C. 154(b) by 0 days.

(21) Appl. No.: 09/582,303

(22) PCT Filed: Dec. 22, 1998

(86) PCT No.: PCT/GB98/03797
§ 371 (c)(1),
(2), (4) Date: Jun. 22, 2000

(87) PCT Pub. No.: WO99/33636
PCT Pub. Date: Jul. 8, 1999

(30) Foreign Application Priority Data

Dec. 23, 1997 (GB) .............................................. 9727107
Jan. 16, 1998 (GB) .............................................. 9800883
Mar. 20, 1998 (GB) .............................................. 9805865

(51) Int. Cl.[7] ........................ B29C 49/06; B29C 49/10
(52) U.S. Cl. ...................... 264/532; 264/550; 264/554; 425/326.1; 425/387.1; 425/526; 425/529; 425/533
(58) Field of Search ................................. 425/529, 526, 425/533, 387.1, 326.1; 268/531, 532, 550, 554

(56) References Cited

U.S. PATENT DOCUMENTS

| | | | | |
|---|---|---|---|---|
| 2,913,762 A | * | 11/1959 | Knowles | 425/533 |
| 3,298,893 A | * | 1/1967 | Allen | 264/532 |
| 3,341,644 A | * | 9/1967 | Allen | 264/532 |
| 3,390,427 A | * | 7/1968 | Ruekberg | 264/526 |
| 3,470,282 A | * | 9/1969 | Scalora | 264/532 |
| 3,558,751 A | * | 1/1971 | Santelli | 264/520 |
| 3,634,182 A | * | 1/1972 | Biglin et al. | 428/156 |
| 3,659,995 A | * | 5/1972 | La Grutta | 425/533 |
| 3,881,855 A | * | 5/1975 | Farkas | 425/533 |
| 3,969,058 A | * | 7/1976 | Procter | 425/529 |
| 4,035,461 A | * | 7/1977 | Korth | 264/534 |
| 4,233,021 A | * | 11/1980 | Spurr | 425/525 |
| 4,327,052 A | * | 4/1982 | Sauer | 264/532 |
| 4,615,667 A | * | 10/1986 | Roy | 264/532 |
| 4,732,557 A | * | 3/1988 | Aoki | 425/529 |
| 5,364,585 A | * | 11/1994 | Takeuchi | 264/532 |
| 5,620,650 A | * | 4/1997 | Nakajima et al. | 264/532 |

FOREIGN PATENT DOCUMENTS

DE 2011928 A * 12/1971

* cited by examiner

Primary Examiner—Robert B. Davis

(57) ABSTRACT

A mould tool comprises a primary cavity part (201), a core part (202), a secondary cavity assembly (203) and an actuation ring (204). The primary cavity part (201) is attached to the fixed platen of a moulding machine in use and incorporates an injection gate (211). The core part (202) is attached to the moving platen and has a fixed portion (2021) having outside its preform shaping surfaces (20211) four pivot points (224)—of which two are shown—for the secondary cavity petals (2030), of which there are four. Also the core part incorporates a movable portion (2022), comprised of a preform shaping end plate (20221), a carrier (20222) for the end plate, a pair of movement rods (20223) to which the carrier is attached and which are housed in bores (20224) in the core (202) via linear bearings (20225).

23 Claims, 11 Drawing Sheets

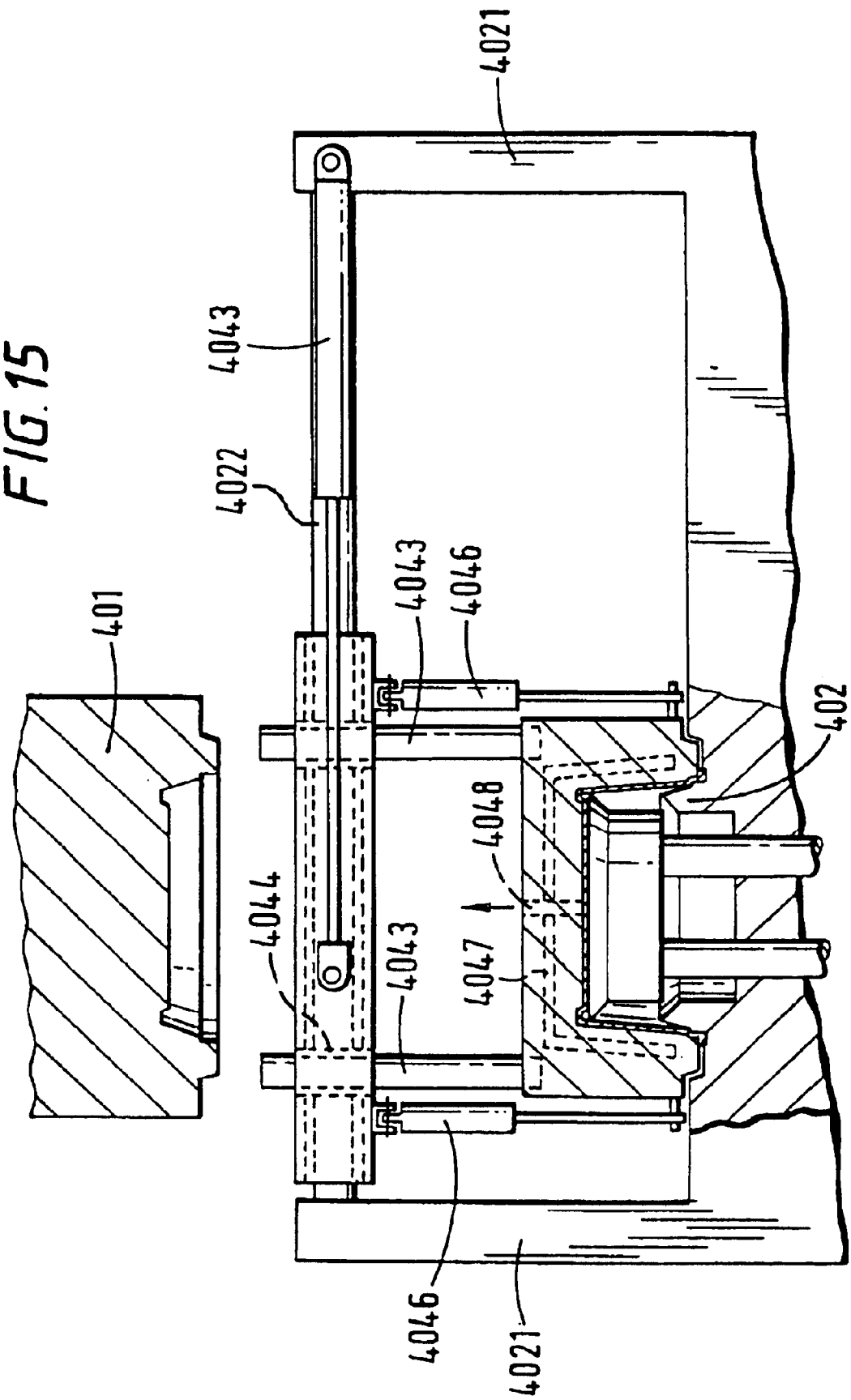

THERMOFORMING OR BLOW MOULDING OF INJECTION MOULDED PREFORMS

TECHNICAL FIELD

The present invention relates to a method of forming an article via injection of plastics material into a mould.

BACKGROUND OF THE INVENTION

Various methods of forming thermoplastics materials into articles are known:

1. Injection moulding involves injection of the material into a mould, which is filled. The material solidifies in the mould and takes up its shape. The general rule is that the wall thickness of the article, that is the gap between opposite parts of the mould should be uniform. There is a practical limitation on the wall thickness, in that it is difficult to mould walls thinner than the order of 0.3 mm. With thinner wall thickness, the mould becomes very difficult to fill completely and reliably. This is because a long thin passage for the material exists from the injection port into the mould to the opposite end of the article. The so called flow length: thickness ratio is too high. The result is that injection moulding is impractical and/or uneconomic for certain classes of product, such as vending machine cups.

2. Injection/blow moulding is a process whereby the wall thickness of an article initially formed by injection is reduced by blowing the article to a large diameter—or other cross-sectional dimension. In an injection/blow moulding process, the initially formed article—the preform—is indexed from the original cavity to another cavity into whose shape it is to be blown. The process of indexing, coupled with adequate cooling of the preform before opening of the initial cavity away from the core results in the preform being likely to be too cool for blowing immediately on introduction into the second cavity. Further, cooling of the preform gives it stability for the indexing. After indexing, a delay is necessary before blowing with gas pressure at the core side, to allow for heat soak from the core to warm the preform again to a plastic state. Consequently, injection/blow moulding is a relatively slow process, but nevertheless widely used for bottle production.

3. An alternative, especially for wide mouth containers is for the material to be thermoformed. In this process, an extruded sheet is peripherally gripped and blown into a cavity. The process stretches the material and a wall thickness less than that practical with injection moulding can be achieved. Usually the result is an uneven wall thickness, with a thicker wall in a base of the article and a thinner wall in its sides. Further there is liable to be wastage at the periphery and in gaps between successive articles formed from the extrusion.

SUMMARY OF THE INVENTION

The object of the present invention is to provide an improved method of forming a plastics article.

According to a first aspect of the invention there is provided a method of forming a plastics material article, consisting in the steps of:

forming an injection moulded preform between a pair of complementary mould parts, which define an initial mould cavity for injection of the preform, separating the one of the complementary mould parts (hereinafter "the Substitutable Mould Part") from the preform, replacing the Substitutable Mould Part with one or more replacement mould parts (hereinafter "the Replacement Mould Part(s)") to enlarge the mould cavity so as to allow stretching of the preform, stretching at least part of the preform away from the other of the complementary mould parts (hereinafter "the Base Mould Part") for the forming of it to a finished article shape against the Replacement Mould Part and removing the Replacement Mould Part(s) for release of the finish formed article.

Normally, the Base Mould Part will be a core part and the Substitutable Mould Part will be a cavity part. However, it can be envisaged that these two parts could be two identical parts to which the core and cavity terminology would not be appropriate.

The method of the invention differs from the conventional injection/blow moulding process in that the mould parts are not indexed as such. In an indexing mould tool, the preform is withdrawn from the initial cavity and moved to the second cavity, whilst simultaneously another core part is introduced into the first cavity part. Injection and blowing occurs simultaneously at the two cavities. Whilst this may seem to have advantage in producing a finished article for each indexing step, the cycle time is determined by the time required for cooling the preform, indexing and reheating the plastics material to plastic state after cooling for indexing. In the method of the invention, the first cavity mould part will normally be separated early, the second cavity assembled without delay and the preform stretched quickly. It is anticipated that the cycle time will be of the order of 2.5 seconds, in comparison to a typical 5.0 seconds cycle for conventional injection blow moulding.

As explained in more detail below, the Replacement Mould Part(s) may be a plurality of individual pans assembled to form the enlarged cavity or a single Replacement Mould Part for the or each enlarged cavity, the part being moved bodily into position. It is anticipated that the former arrangement will be faster in terms of bringing the second cavity around the preform, but the overall cycle time with the latter arrangement is likely to be quicker, especially where final cooling and/or temperature stabilisation for crystallisation occurs in the enlarged cavity after removal of this from the core.

Whilst the degree of stretching may be greater or less, the stretched portion of the preform will normally be stretched by between a factor of 2:1 and 4:1.

A significant advantage of the invention is that it results in controlled bi-axial orientation of the article or at least its blown portion. The stretching involves axial strain and orients molecules of the plastics material in the direction of stretching. The blowing, involving as it does radial expansion hence circumferential strain, strains the material orthogonally to the axial strain. Hence the bi-axial orientation.

In the method of the invention, the preform is unlikely to move transversely of the machine, although due to the construction of the tool, it is likely to move axially, particularly where injection has been via an injection gate in the Substitutable Mould Part and where the mould tool is a multi-impression stack tool. The preform remains in contact with the Base Mould Part at a temperature suitable for plastic extension until after separation. Further, because there is axial movement only of the preform, the Substitutable Mould Part can be removed early, as soon as the plastics material has been cooled, preferably mostly by this part, to a sufficient extent to hold its shape. The material skins against the Substitutable Mould Part at least prior to withdrawal of the latter. However, the material is unlikely to be solid throughout its thickness (which, it should be remembered is about to be reduced) with the central region of the wall remaining hotter and more flexible. Thus heat soak is able to occur into the skin rendering the entire wall sufficiently flexible to stretch into the Replacement Mould Part.

Normally the method will include injection of gas between it and the Base Mould Part to separate at least part of the preform from the Base Mould Part. The stretching of the preform, or at least part of it, can also be effected by injection of gas between the preform and the Base Mould Part.

Preferably, the stretching of the preform is effected by lifting a portion of the preform from at least part of a main piece of the Base Mould Part by a movable piece of the Base Mould Part. Normally the lifted portion of the preform will be moved by the movable piece of the Base Mould Part as far as a corresponding piece of the Replacement Mould Part(s), and the lifted portion of the preform will be captivated between the movable piece of the Base Mould Part and the corresponding piece of the Replacement Mould Part(s) at the end of the stroke of the movable piece. This has the advantage of enabling moulded features to be reproduced in the base—or equivalent part—of the article. For instance, the base may be formed in such a manner as to ensure that it stands stably without the centre being depressed. The captivation of the lifted portion of the preform can temporarily seal apertures in the lifted portion. This can have particular advantage in the case of plant pots, whereby drainage apertures can be moulded in (obviously the preform could not be blown without some means of obturating the drainage apertures).

The injection of gas can be started before the movable piece of the Base Mould Part is moved. Again, the injection of gas can be started before the replacement with the Replacement Mould Part(s) is complete. Whilst the preform can be attached to a main piece of the Base Mould Part by virtue of this piece being polished, at least locally; the preform will normally be is stretched from a portion of it temporarily captivated by the Replacement Mould Part(s), with the stretching being to substantially the final shape of the finish formed article.

In some embodiments, the stretched portion of the preform will be urged into contact with the Replacement Mould Part(s) for its final temperature control, to bring the article to sufficient rigidity for removal, by application of increased gas pressure on the Base Mould Part side of the preform (which may be from gas applied for lifting and/or stretching of the preform). In other embodiments, an alternative of reduced gas pressure on the Replacement Mould Part(s) side of the preform will be used. The final temperature control will normally be cooling, but in the case of CPET material, it will be holding of the article at elevated temperature for crystallisation to occur.

In one alternative of a particular feature of the invention, the enlarged mould cavity is defined by a plurality of Replacement Mould Parts. In this alternative, the enlarged mould cavity can be assembled by radial movement of the Replacement Mould Parts into their replacement position; or it can be assembled by pivotal movement of the Replacement Mould Parts. Alternatively, the enlarged mould cavity can be defined by a single, or one per impression where the tool has multiple impressions, Replacement Mould Part moved bodily into its replacement position.

The Replacement Mould Part(s) will normally be provided with ducts for temperature control fluid and the article is brought to the temperature required for it to be sufficiently rigid for its removal by passage of temperature control fluid through the ducts after stretching and prior to opening of the Replacement Mould Part(s).

The entire sidewall(s) may be stretched. Alternatively part, typically including a stacking feature, may be moulded to final shape in the preform and captivated in the Replacement Mould Part(s) before stretching, so as to avoid this part being stretched. Again, it can be envisaged that the stretching by the movable piece of the core part may be completed before final positioning of the Replacement Mould Part(s), which are shaped to delimit a rim of the sidewall which can be blown—as in the basic invention—to larger diameter, enabling production of an overhang for instance for stacking.

The plastics material used in the invention may include blowing agent, whereby the sidewall(s) and possibly the base are allowed to expand by foaming. The resultant base and sidewall(s) will be stiffer, in comprising two interconnected skins, than if they were of the same amount of material provided as a thinner solid wall. Use of blowing agent enables a rim of the article and/or a de-nesting feature to be expanded by foaming.

According to another aspect of the invention, there is provided a tool for forming a plastics material article in accordance with the first aspect of the invention, the tool comprising:

a Base Mould Part, preferably a core part,
a Substitutable Mould Part, preferably a first cavity part,
the Base and Substitutable Mould Parts defining an initial mould cavity between them for injection moulding of the preform and being axially movable for separation of the Substitutable Mould Part from the preform,
one or more Replacement Mould Parts movably carried by the Base Mould Part or the Substitutable Mould Part, for movement from a withdrawn position to an advanced position in which it or they provide an enlarged mould cavity defining the outside shape of the finish formed article.

Preferably the tool includes a movable rim forming member, which is slidably mounted on the Base Mould Part for movement, from a rest position in which the Substitutable Mould Part abuts it for moulding of a rim of the article and in which the Replacement Mould Part(s) abut it for captivation of the rim on stretching of the preform, to an advanced position for ejecting the finish formed article.

Further, the Base Mould Part preferably has a movable piece, for lifting a portion of the preform from the Base Mould Part, the movable piece being adapted to seal with a main piece of the Base Mould Part on injection of plastics material. Normally, the movable piece will have a face shaped complementarily with both the opposite face of the Substitutable Mould Part and the Replacement Mould Part(s), whereby the liftable portion of the preform is moulded to final shape in the initial mould cavity. The mould parts can be shaped to form one or more apertures in the liftable portion.

Also, the mould tool preferably includes a pressure gas connection internally of the said main piece and the liftable piece of the Base Mould Part, whereby pressure gas can be introduced on the Base Mould Part side of the preform on lifting of the liftable piece via an aperture in the said main piece normally closed by the liftable piece.

As indicated above a plurality of Replacement Mould Parts can be translationally or pivotally mounted on the Base Mould Part for movement to form the enlarged cavity, with means being provided for moving the Replacement Mould Parts between their withdrawn position and their advanced position.

In the case of pivotal mounting of the Replacement Mould Parts, the means for moving the Replacement Mould Pans can include a slidable member mounted on the Base Mould Part and respective connecting rods connecting the slidable member and the Replacement Mould Parts, the slidable member and the rods being arranged for advance and withdrawal of the Replacement Mould Parts between a withdrawn position in which the Substitutable Mould Part can close on the Base Mould Part and is an advanced position in which the Replacement Mould Parts can close on the Base Mould Part.

In the case wherein a single, or one per impression where the tool has multiple impressions, Replacement Mould Part is translationally mounted on the Substitutable Mould Part or on the Base Mould Part for bodily movement to provide the enlarged cavity, the mould tool includes:

- a first slide and actuator carried on the Substitutable Mould Part or on the Base Mould Part, the slide extending at least substantially radially of a centreline of the mould tool,
- a Replacement Mould Part carrier slidably mounted on the slide under control of the actuator and
- a second slide and actuator carried on the carrier and extending at least substantially parallel to the centreline of the mould tool, the Replacement Mould Part being mounted on the second slide under control of the second actuator.

Further, the mould tool preferably includes a vacuum duct in the Replacement Mould Part extending from an external vacuum connection point to at least one internal vacuum point opening into the enlarged cavity, whereby the finish formed article can be held in the enlarged cavity on withdrawal of the Replacement Mould Part from the Base Mould Part.

This mould tool is preferably provided, in combination with a control system adapted and arranged for:

- actuation of the first actuator for inwards radial movement of the carrier and Replacement Mould Part after opening of the Substitutable Mould Part to align the Replacement Mould Part with the Base Mould Part and outwards after stretching of the preform
- reciprocating actuation of the second actuator for axial movement of the Replacement Mould Part into abutment with the Base Mould Part for stretching of the preform and out of abutment after stretching of the preform.

According to a third aspect of the invention there is provided a finish formed article made in accordance with the method of the first aspect of the invention.

BRIEF DESCRIPTION OF THE DRAWINGS

To help understanding of the invention, specific embodiments thereof will now be described by way of example and with reference to the accompanying drawings, in which:

FIG. 15 is a similar view with the mould tool of FIG. 14 with its second cavity closed.

BEST MODE FOR CARRYING OUT THE INVENTION

Figure 1:
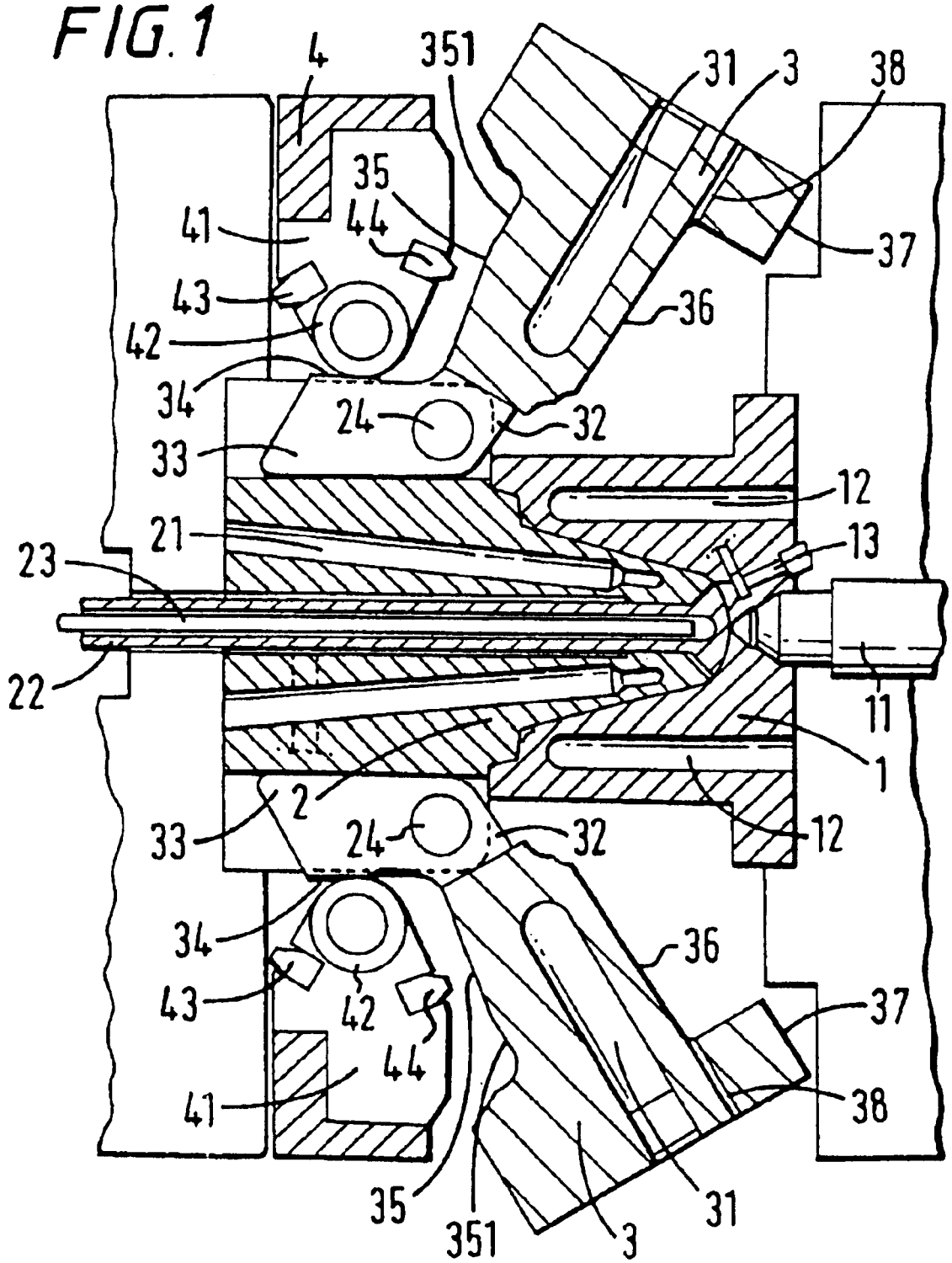
FIG. 1 is a cross-sectional side view of a mould tool in accordance with the invention, with a primary cavity closed by a substitutable cavity part.
Figure 2:
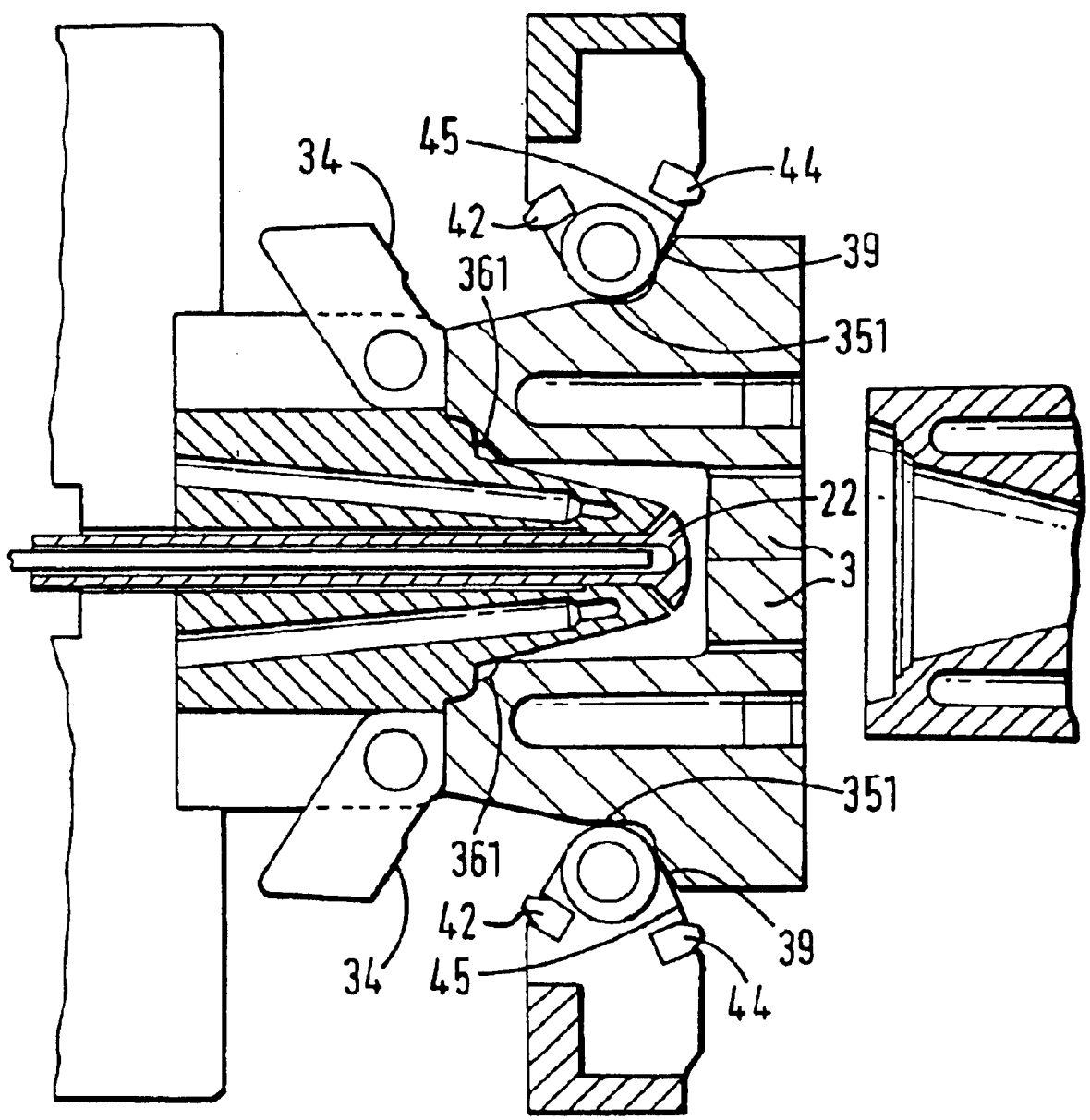
FIG. 2 is a similar view of the mould tool of FIG. 1 with a secondary cavity closed.
Figure 3:
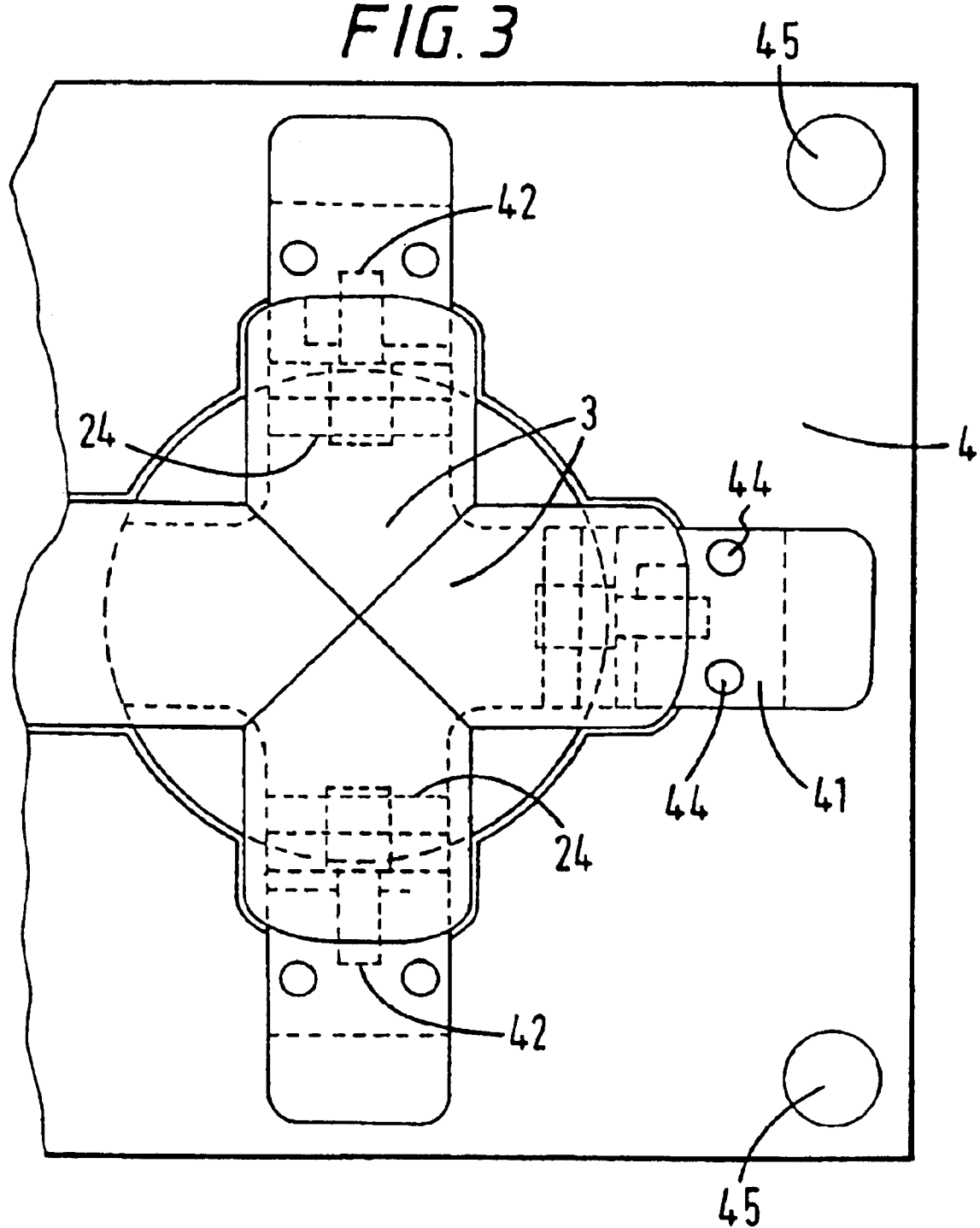
FIG. 3 is an end view, from the right in FIG. 2, of replacement petals closed to form the secondary cavity.
Figure 4:
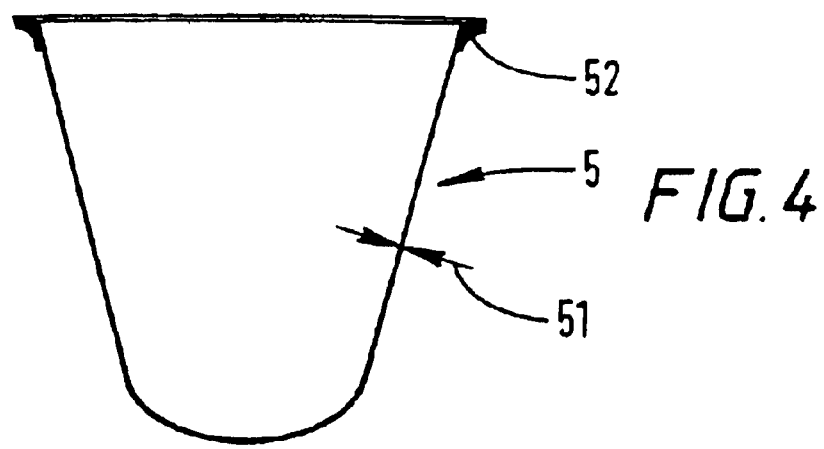
FIG. 4 is a cross-sectional side view of a preform from the mould tool of FIG. 1.
Figure 5:
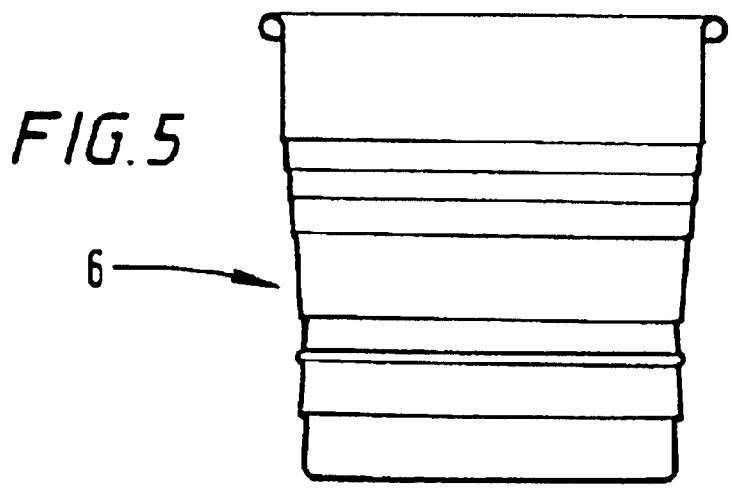
FIG. 5 is a similar view of the finish formed article form the mould tool of FIG. 1.

Referring to FIGS. 1 to 5 of the drawings, the first mould tool comprises a substitutable, primary cavity part 1, a core part 2, a replacement, secondary cavity petals 3 and an actuation ring 4. The primary cavity part 1 is attached to the fixed platen (not shown) of a moulding machine in use and incorporates an injection gate 11, temperature control passages 12 and an ejection poppet valve 13.

The core part 2 is attached to the moving platen (not shown), has temperature control passages 21, a blowing air valve 22 with its own temperature control passages 23 and four pivot points 24 for the secondary cavity petals 3, of which there are four.

The petals 3 have their own temperature control passages 31. They are generally L shaped and pivotally connected to the core at the elbow 32 of the L, which is rather more open than a conventional L. The feet 33 of the L include an "opening" surface 34, whilst the limbs of the L comprise a "closure" surface 35 on one side and a cavity surface 36 on the other side. They also comprise abutment surfaces 37 which mutually abut when the petals are closed to form the secondary cavity. Air bleeds 38 are provided.

The ring 4 carries four roller supports 41 having rollers 42 for co-operating with the opening and closure surfaces 34,35 and buffers 43,44. The ring is slidably supported on four bars 45.

In use, the ring 4 is withdrawn by a hydraulic ejection actuator (not shown) in the direction away from the primary cavity part 1 and the core part 2 is advanced into contact with the primary cavity part, as shown in FIG. 1. Closure of the mould defines a mould cavity having the shape of the preform 5 shape, which is for a cup. It has a wall thickness 51 of 0.3 mm except at the rim 52, which is thicker for foaming expansion. Within 0.2 sec. of the end of the injection of plastics material through the gate 11 to fill the mould gap between the core and the primary cavity parts, with a skin just formed against the cavity part, the core part 2 is withdrawn to the left in FIG. 1, with application of air pressure to the poppet valve 13, whereby the moulded preform is withdrawal with the primary cavity, which is to be substituted around the preform by the replacement petals 3.

As soon as the core part is withdrawn sufficiently for mechanical clearance, the ring 4 is advanced. The rollers 42 leave the opening surfaces 34 and the forward buffers 43 knock the petals forward. The rollers then engage the closure surfaces 35 as the petals 3 swing closed about the pivots 24. The surfaces 35 have parallel ends 351, whereby when limit surfaces 45,39 on the roller supports and the petals engage, the petals are firmly held closed, see FIG. 2. This position is reached within 0.5 sec. of core withdrawal, whereupon gas—suitably nitrogen at 40 bar—is blown through the valve 22 and the preform is expanded into the secondary cavity, to take up the shape 6 of the finished product. It should be noted that the petals have a groove 361 for allowing the rim 52 to expand. The typical wall thickness of the finished product is 0.2 mm.

Immediately after blowing, the ring 4 is withdrawn, the rear buffers 44 knock the petals open and product fills from the tool. The latter can now close again for the next cycle. The total cycle time is expected to be 2½ seconds.

Temperature control is important—as always in injection moulding. It is to be expected that the primary cavity part and the petals will be run cold, respectively to cause the preform to skin and allow early opening and to cause the blown product to become rigid for early opening of the petals. However, it is expected that the core part will be run warmer, so as to allow the preform to be in a state able to expand plastically when the gas is blown into the mould tool.

Figure 6:
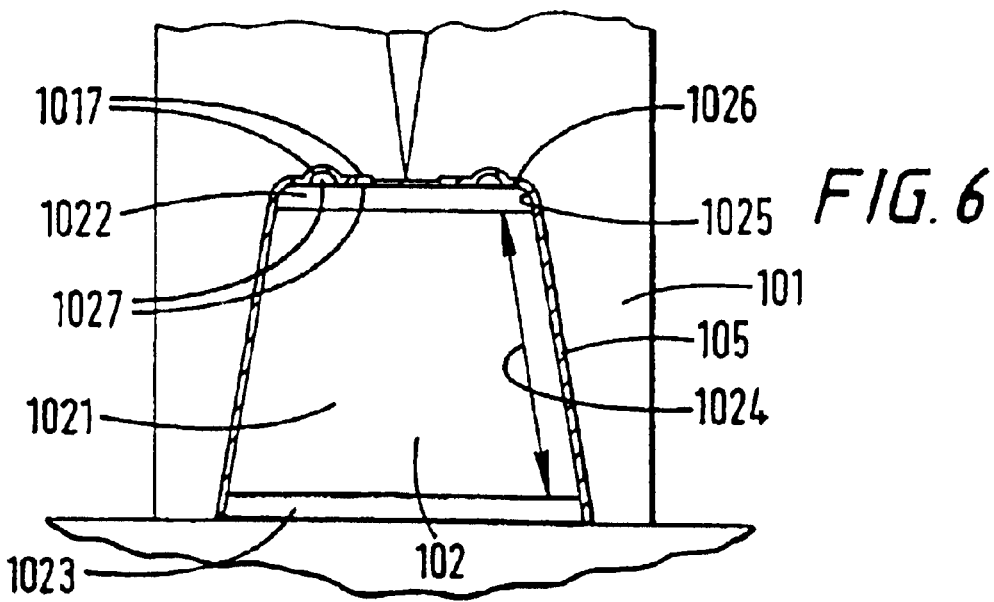
FIG. 6 is a diagrammatic view of a second mould tool of the invention with its primary cavity closed and a preform injected.
Figure 7:
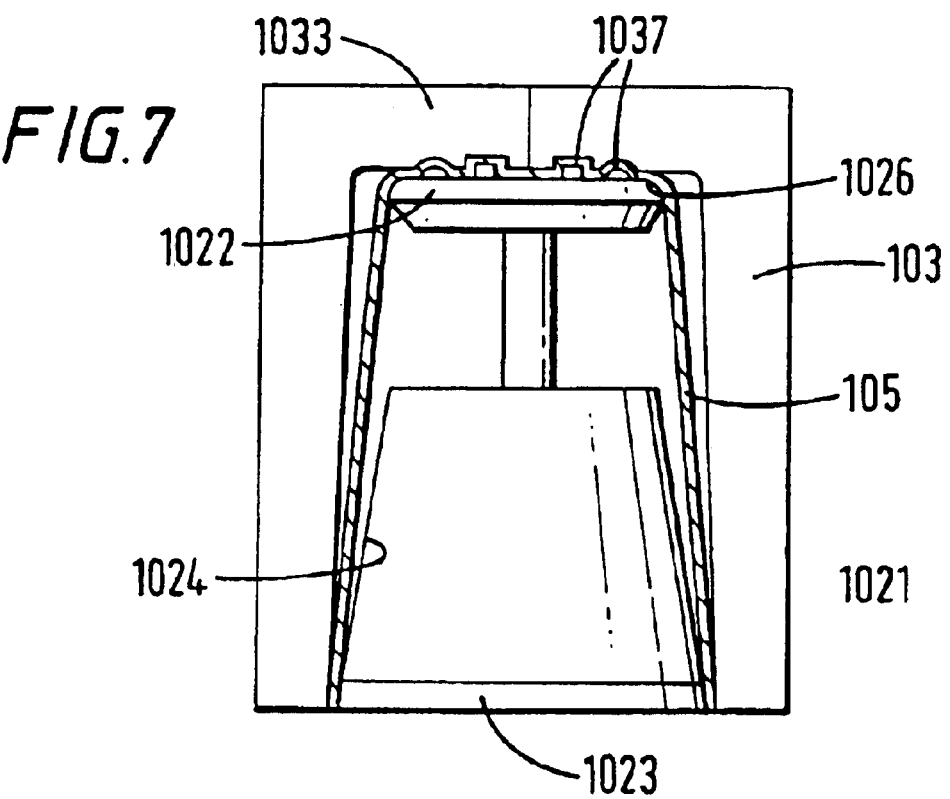
FIG. 7 is a similar view of the second mould tool with the preform stretched by a movable portion of the core.
Figure 8:
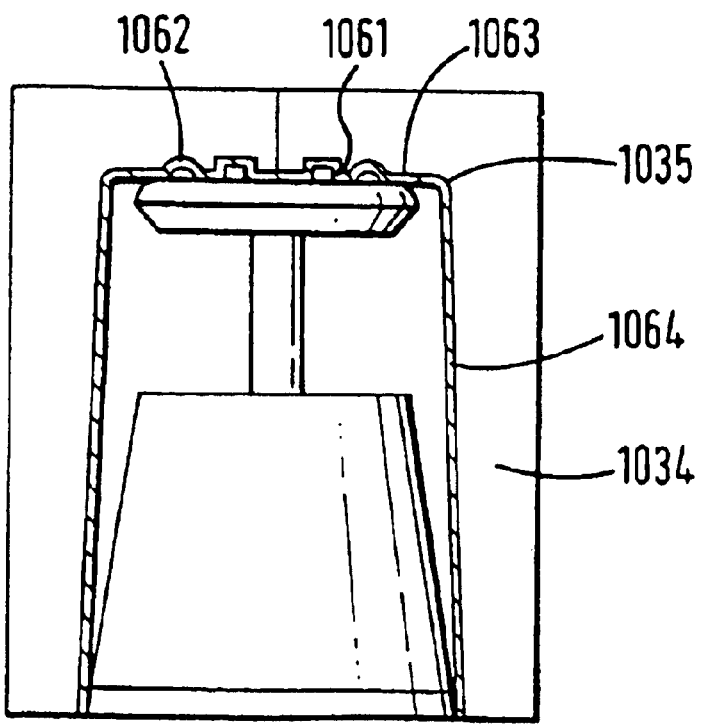
FIG. 8 is a similar view of the tool with the preform blown to finish formed shape.

Referring now to FIGS. 6, 7 & 8, the mould tool diagrammatically shown there comprises a primary cavity part 101, a core part 102, and secondary cavity petals 103, which are essentially similar to the primary cavity part 1, the core part 2, and the secondary cavity petals 3. The exception is that the core part is shaped as a truncated cone and comprised of a fixed portion 1021 and a movable portion 1022. At the proximal end of the core, the fixed portion has a narrow polished band 1023, whilst the balance of its length 1024 is matt finished as by bead blasting. The movable portion 1022 is of the same diameter as the distal end of the fixed portion and mates with it in the manner of a conical valve, whereby injected plastics material cannot enter between the portions, whereas the portions are readily separable by an actuator (not shown) for stretching of the preform 105 and egress of pressurised gas from within the core. The movable portion 1022 is relatively short in comparison with the fixed portion and is in the form of a disc with a matt radiused corner 1025 and a polished ring 1026 on its end face. Within the ring 1026, the movable disc has formations 1027 which together with formations 1017 in the cavity and formations 1037 in the ends 1033 of the petals form apertures 1061 and feet 1062 in a base 1063 of the finish formed article, which is a plant pot 106. It has sidewalls 1064.

On closure of the primary cavity part 101 and the core part 102 and injection of plastics material into the mould cavity, the preform 105 is formed. The core part 102 is withdrawn from the substitutable, primary cavity part 101 and the petals 103 are closed around the core part and the preform. The movable disc 1022 is then advanced. In so doing, it axially stretches the preform between the polished banded 1023 and the polished ring 1026. At these polished areas, the plastics material is held onto the metal of the core, whereas it lifts from the metal at the intervening matt region 1024. In so doing a gap is opened between the plastics material and the core. This is filled with low pressure gas released as the movable disc is advanced, whereby the material is stretched without being influenced by unintentional stiction with the fixed portion 1021 of the core.

On completion of the forwards movement of the movable disc 1022, the plastics material within the polished ring 1026 is carried forwards into contact with the petals 103 and the features formed by the cavity formations 1027 are mated with corresponding petal formations 1037, whereby as the material fully cools the base 1063, with its apertures 1061 and feet 1062, sets off. As soon as the ring has reached to this end of its stroke, higher pressure gas is released from the core, causing the stretched side wall 1064 to be expanded out circumferentially to the sides 1034 of the petals. At the radiused corner 1025 of the ring, the material rolls and is stretched into the corners 1035 of the petals.

Turning now to FIGS. 9 to 12, the mould tool comprises a primary cavity part 201, a core part 202, a secondary cavity assembly 203 and an actuation ring 204. The primary cavity part 201 is attached to the fixed platen (not shown) of a moulding machine in use and incorporates an injection gate 211, which preferably is a mechanical valve shut off gate.

The core part 202 is attached to the moving platen (not shown) and has a fixed portion 2021 having outside its preform shaping surfaces 20211 four pivot points 224—of which two are shown—for the secondary cavity petals 2030, of which there are four. The four petals meet in a double/stem-to-stein Y formation, that is with two petals abutting at the stems of the Y's and two other petals having points Filling the gaps in the heads of the Y's. Also the core part incorporates a movable portion 2022, comprised of a preform shaping end plate 20221, a carrier 20222 for the end plate, a pair of movement rods 20223 to which the carrier is attached and which are housed in bores 20224 in the core 202 via linear bearings 20225. The rods are reciprocatably movable by the hydraulic ejector actuator of the moulding machine, not shown. The end plate 20221 and the fixed portion 2021 have bevelled surfaces 20226 which seal under injection pressure. Centrally of the bores 20224 is a gas introduction passage 20227.

The core part also has an ejector ring 20228 and a plurality of pneumatic actuators 20229 therefor.

The petals 2030 are generally L shaped and pivotally connected via the pivot points 224 to the core at the distal ends of the long limb 2031 of the L. The long limb and the short limb 2032 have respective article shape definition surfaces 2033, 2034. The petals are connected to the actuation ring 204 via connecting rods 2036 pivotally connected to the ring and the petals via respective trunnnions 2037. In the withdrawn position of the ring 2035, the petals are swung away from the core. In the advanced position of the ring the petals are swung over the core, when of course the primary cavity part 201 has been withdrawn from the core. In this position the petals assemble to form a secondary cavity. It should be noted that the three dimensional shape of the petals and the article is not shown in the drawings. However, it can be rectangular, circular, oval or other shape.

Figure 11:
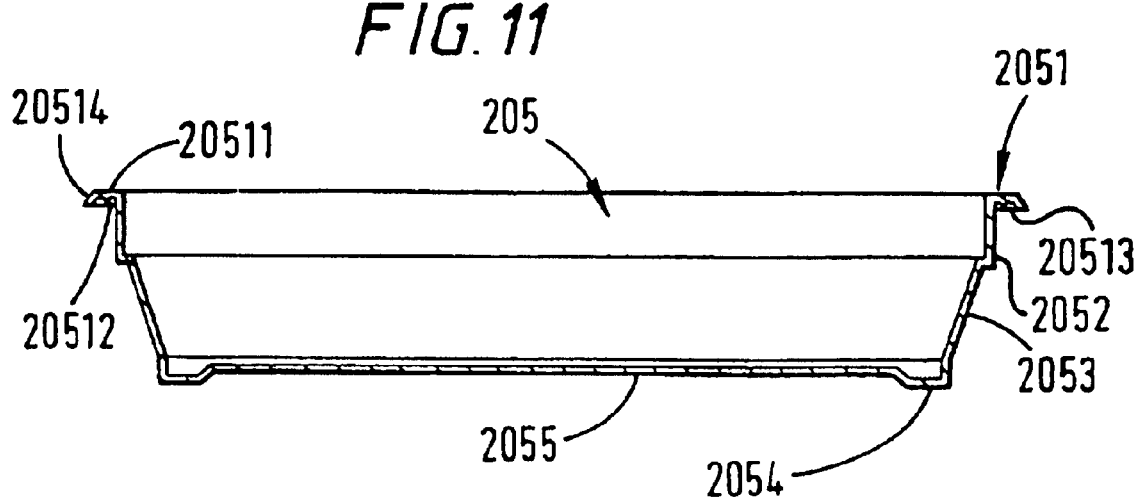
FIG. 11 is a similar view of the preform as injected.
Figure 12:
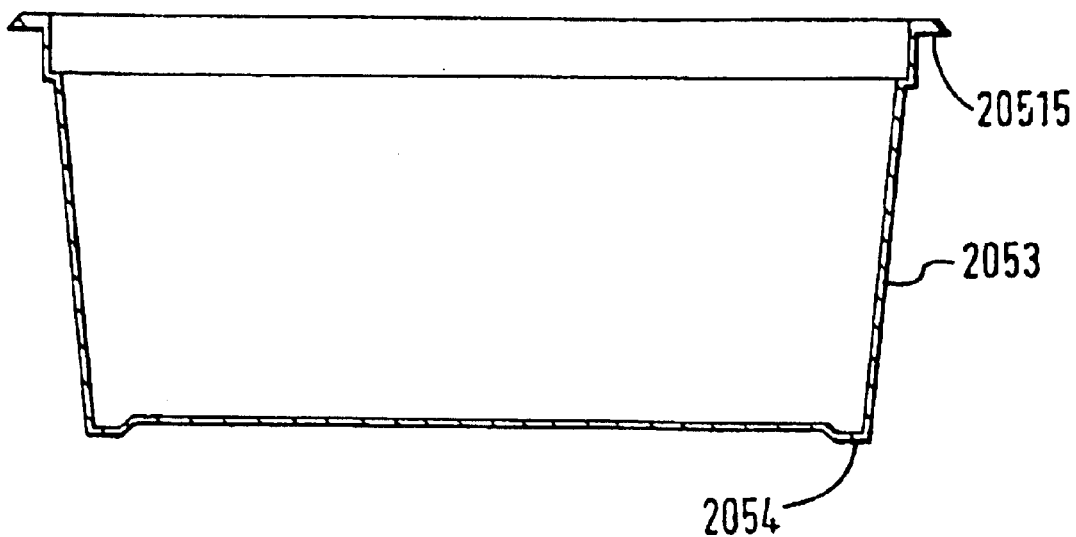
FIG. 12 is a similar view of the finish formed article. It should be noted that the wall thicknesses shown in FIGS. 11 and 12 are exaggerated for clarity.

Turning now to FIG. 11, the preform shape 205, as defined by the core 202 including the end plate 20221—and the primary cavity 201, is there shown. It should be particularly noted that in the normal course of events, the preform will not be made as a solidified article. It is formed by initial injection and is finally shaped before it has solidified to final shape. However, its injected shape is important. It comprises:

a rim 2051, whose shape will be described in more detail below, a stacking step 2052, a sidewall 2053, which is thicker than the slacking step, and a base 2054 with a raised central portion 2055, the base having the same thickness as the stacking step.

The plastics material with which the article is to be formed has a blowing agent incorporated in it.

Immediately after injection and on solidification of the rim, base and outer skin of the preform, the primary cavity is withdrawn—or rather the core and the preform are withdrawn from the primary cavity. Simultaneously three events then occur:

The pneumatic actuators—not shown—are actuated, to cause the petals to swing in;

The hydraulic ejector actuator of the moulding machine—not shown—is actuated, to move the end plate 20221 to carry the base 2054 towards the base surfaces 2034 of the petals; and Pressurised gas is introduced within the preform via the passage 20227.

The result is that the sidewalls 2053 are stretched to their final height. The stacking step 2052 is not stretched, partly because it is moulded on a polished core surface and partly because it is captivated by the petals. The base is not stretched because it is simply carried forwards on the end plate 20221. Both these elements of the finish formed article remain as moulded in the preform and are cooled by the respective parts of the tool with which they are in contact.

The sidewalls unrestrained as it is being stretched, except that there is low pressure gas within the preform, which is of such pressure to urge the sidewall into contact with the petal side surfaces 2033 once the stretching is complete. However, prior to this, the sidewall is relatively unrestrained. Its initial thickness is greater than that of the stack step. Immediately before the end plate is moved forwards to stretch the sidewall, there is short delay. Internally the sidewall has molten plastics material with blowing agent, which causes the inner and outer skins of the sidewall to separate, creating a foamed structure therebetween. Once this separation has occurred during the delay, the two skins are stretched by movement of the end plate. This draws the skins straight and reduces their separation due to the action of the blowing agent. When the outer skin comes into firm contact with the side surfaces 2033, due to the action of the internal pressure, the action of the blowing agent is quenched by solidification of the sidewalls, the petals being internally cooled. The final thickness of the sidewall is controlled by the gas pressure applied via the passage 20227 acting to counterbalance the internal foaming gas pressure.

The rim 2051 has a fat top 20511, formed by a recess in the ejector ring 20228. The underside of the rim as formed in the preform by the primary cavity has a narrow channel 20512 adjacent to the stacking step and broader channel 20513 with a thicker wall. The edge of the rim 20514 tapers down from the top 20511 as a denesting feature. When the rim is enclosed by the petals, it is restrained to have a flat underside 20515. The thick wall of the broader channel 20513 expands by foaming with its skin length remaining substantially constant. The result is that the narrow channel closes and the resultant rim has a uniform depth, giving it considerable stiffness. This effect is in accordance with our International application No. PCT/GB96/01706.

Once the article has been cooled in its finished shape, the petals are opened, and the ejector ring 20228 advanced to eject the product from the tooling. The tool can now be cycled again.

Figure 9:
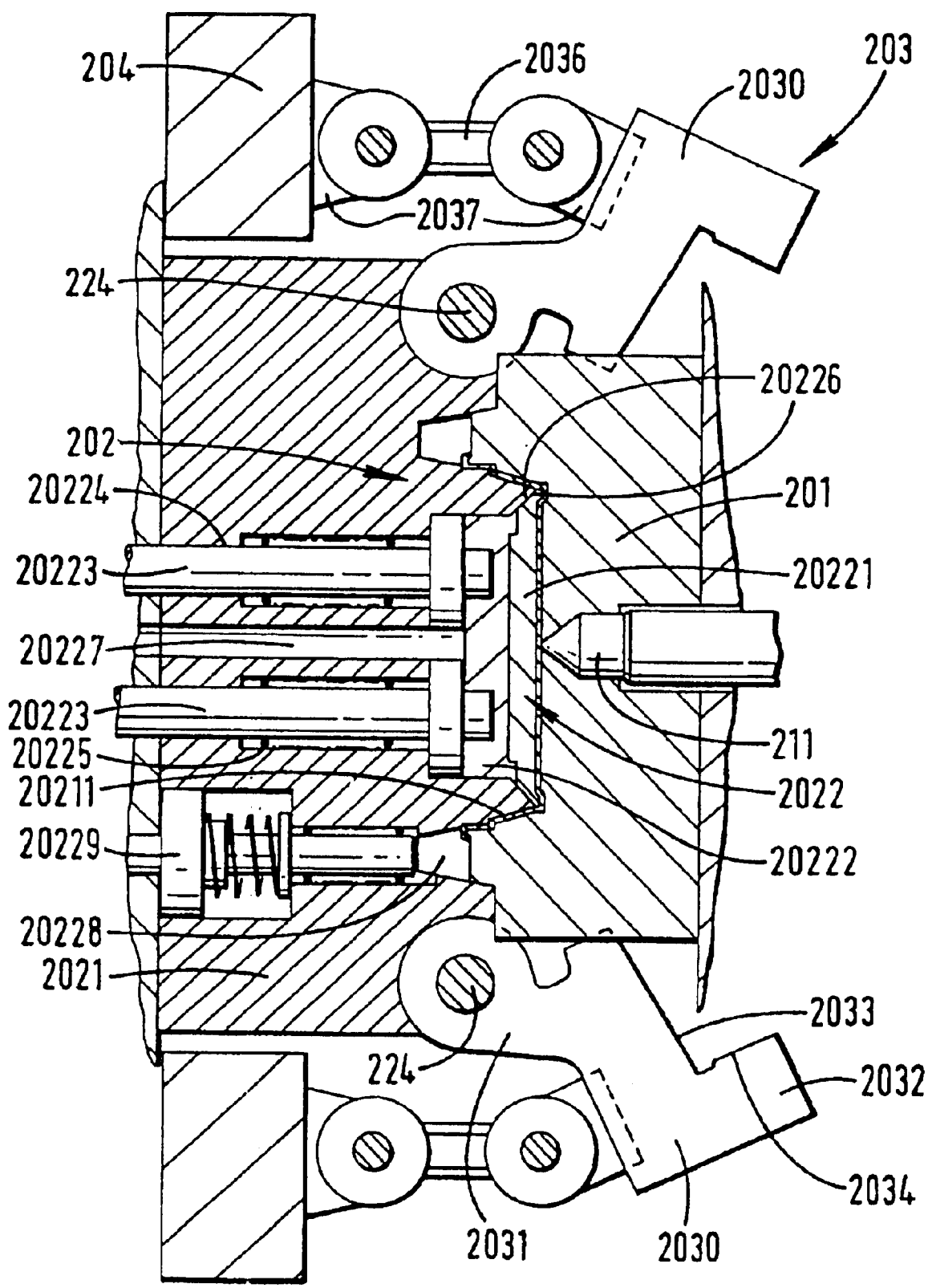
FIG. 9 is a cross-sectional side view, similar to FIG. 1, of a third mould tool for the invention, with its primary cavity closed.
Figure 10:
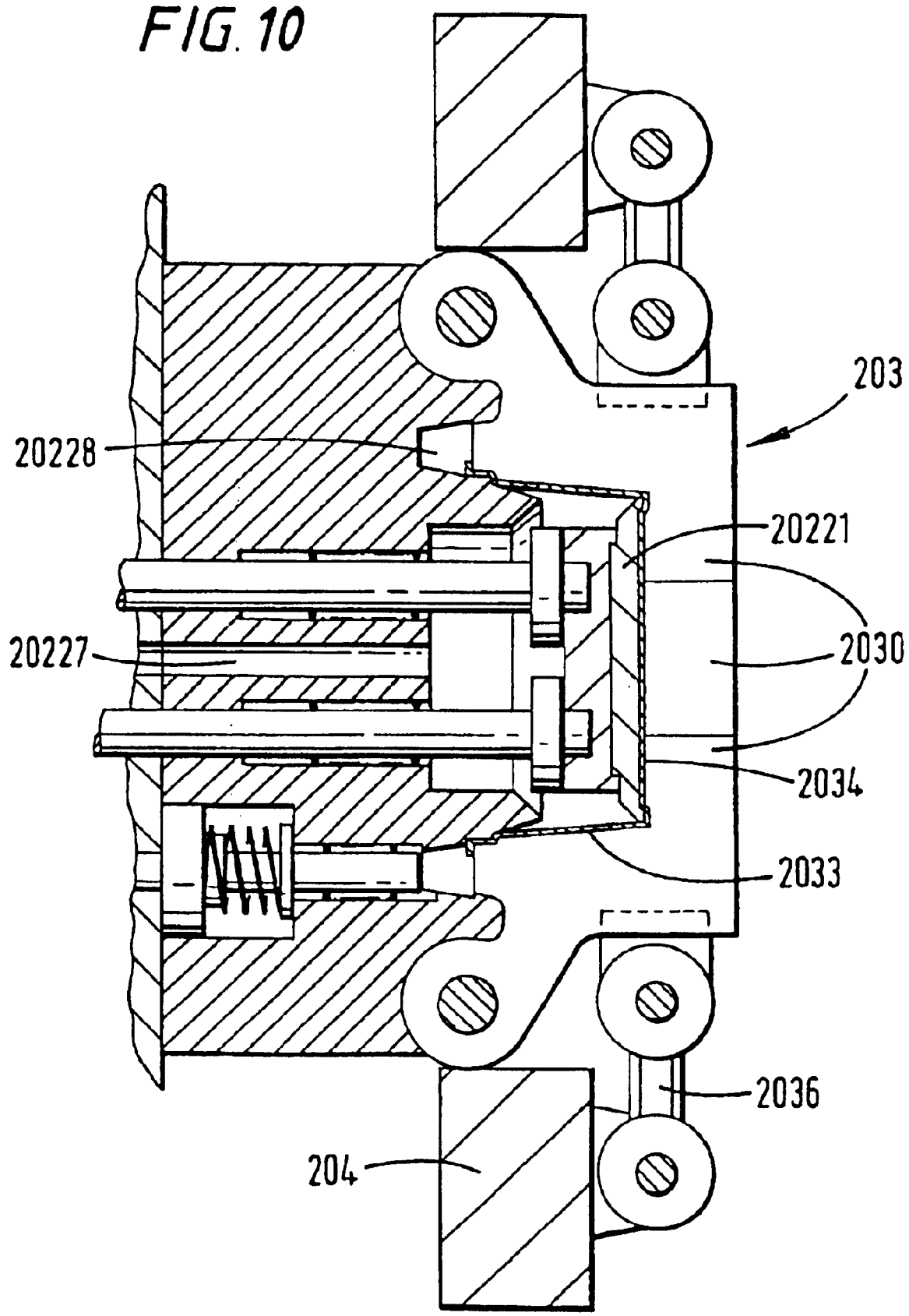
FIG. 10 is a similar view with the substitutable cavity part of its primary cavity withdrawn, an assembly of replacement petals in their closed position providing a secondary cavity and a movable portion of the core advanced to stretch the preform.
Figure 13:
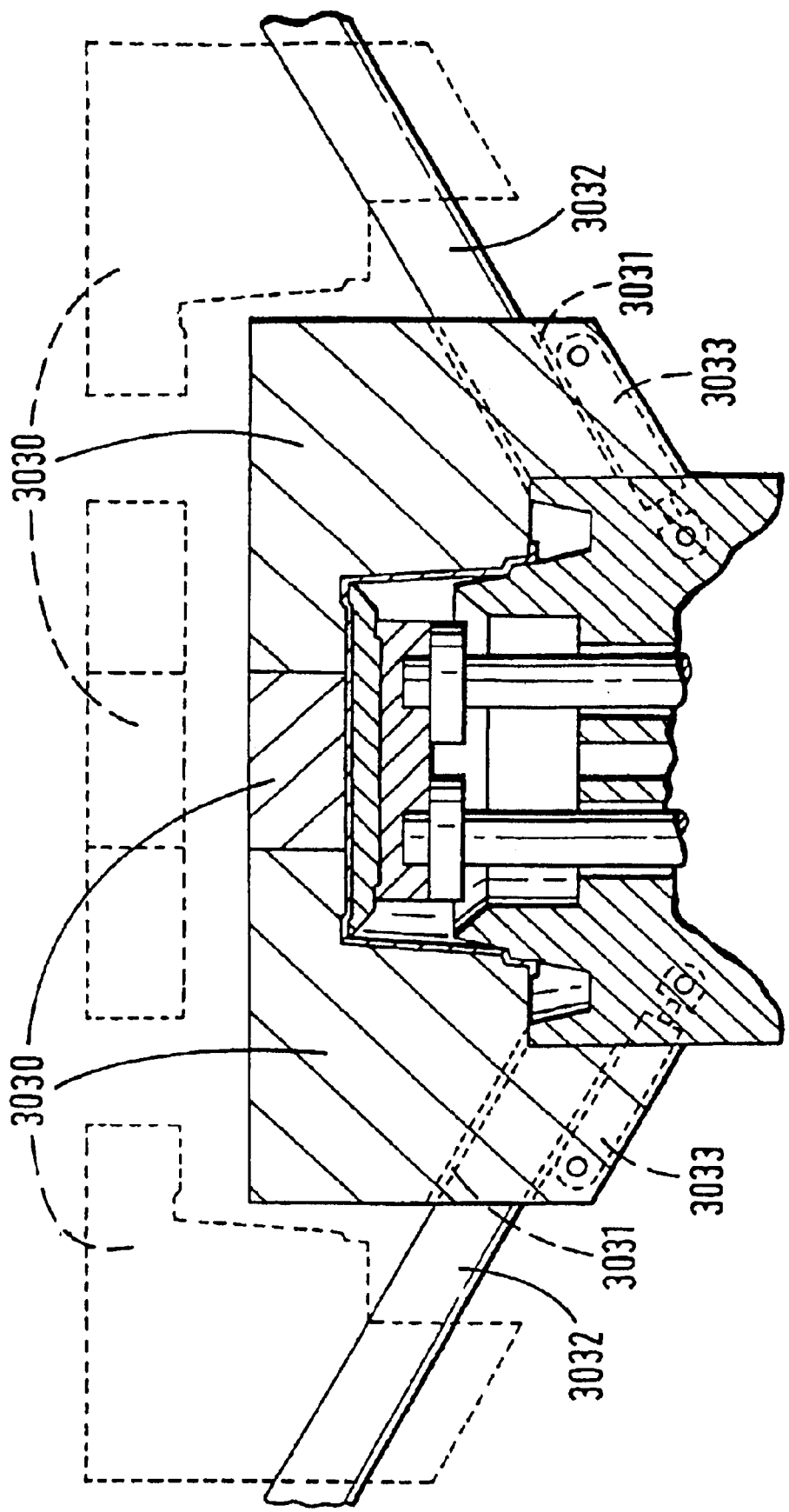
FIG. 13 is a view similar to FIG. 6 of an alternative arrangement for mounting petals in a tool such as that of FIG. 9.

FIG. 13 shows an alternative to the pivotal arrangement of the petals in FIGS. 9 & 10. Those 3030 of FIG. 13 are slidingly mounted via bearings 3031 on is radiating rods 3032. There are two rods for each petal, whereby the latter are restrained to move translationally only. Actuators 3033 control their movement between a withdrawn position, shown in broken lines and an advanced position shown in full lines. The operation of this tool is analogous to that of FIGS. 9 & 10.

Figure 14:
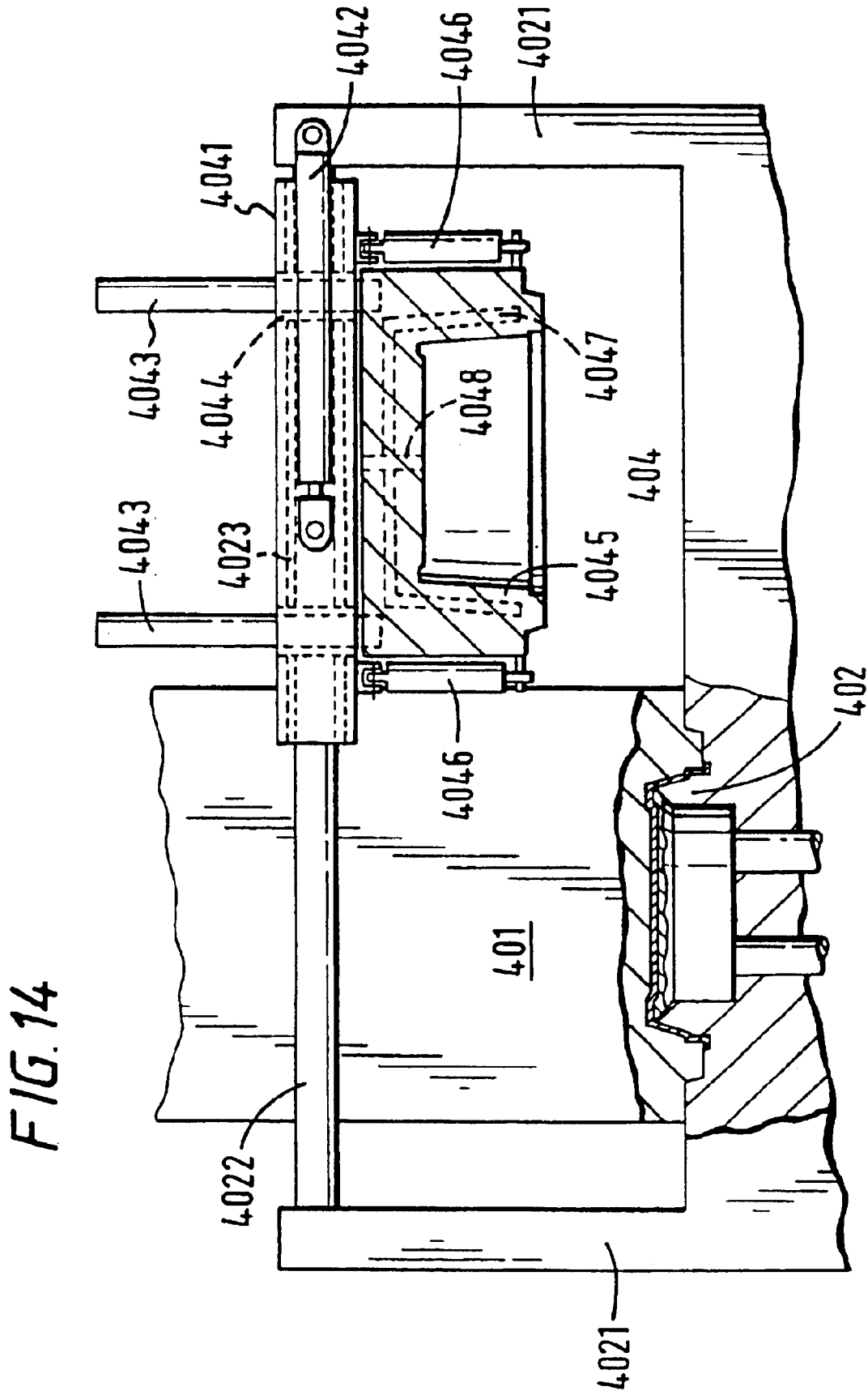
FIG. 14 is a another diagrammatic view of a mould tool according to the invention, this tooling having a bodily movable second cavity mould part and being shown with its primary cavity closed.

Referring now to FIGS. 14 & 15, the mould tool there shown again has a core part 402 similar to that of FIGS. 9 & 10. It is not described again. Mounted on the core part at widely spaced trunnions 4021, with a pair of shafts 4022 extending between them, one above the core as such and one below it so as to allow clearance for the first cavity mould part 401 and the second cavity mould part 404 to mate with the core. The first cavity mould part 401 is again similar to that of FIGS. 9 & 10 and will not be described again.

Mounted on the shafts 4022 via bearings 4023 is a second mould part carrier 4041. Its position along the shafts is controlled by an actuator 4042. The carrier itself supports four shafts 4043 via bearings 4044 fitted in the carrier, the shafts being parallel to the centreline of the tool. The shafts are fitted to a second cavity member 4045, which is thus carried by the carrier. The position of the second cavity member 4045 relative to its carrier 4041 axially of the tool is controlled by a pair of actuators 4046; whilst its position radially of the tool is controlled by the actuator 4042. The cavity member 4045 has temperature control ducts 4047 and a vacuum passage 4048. Flexible temperature control fluid and vacuum lines are provided, although not shown.

The sequence of operation is as follows:

with the radial actuator 4042 and the axial actuators 4046 in withdrawn position, the first cavity mould part 401 part is advanced and the preform is injected;

the first cavity mould part and core pan are separated and the radial actuator 4042 is actuated to drive the second cavity member 4045 into alignment with the core part 402;

the second cavity member 4045 is driven by the axial actuators 4046 into abutment with the core part 402 and the preform is stretched into the second cavity;

gas pressure is applied within the preform and vacuum is applied without it, the latter via the passage 4048;

the second cavity member 4045 is withdrawn as soon as the moulding has chilled in the second cavity enough to hold its shape;

the final cooling—or higher temperature crystallisation in the case of CPET material—is carried out by passage of suitable fluid through the ducts 4047 as the shaped article is carried from the core part by the carrier on return stroking of the actuators; and the finish formed article is ejected from the second cavity by changing of the vacuum in the passage 4048 for pressure gas.

The invention is not restricted to the details of the above described embodiment. For instance the finished product as described with reference to FIGS. 1 to 5 is a circular cup. However, a wide variety of products are expected to be able to be made by the method of the invention. The side wall(s) need not be plain and can be contoured, with relief designs being provided, and the sidewalls of the product being urged into the relief by the gas pressure within the preform. More or less than four petals may be provided. Further for products having particularly vulnerable areas, such as corners, the wall thickness of the preform may be varied in areas stretching into the vulnerable areas, to reinforce them. This may involve thickening of adjacent areas to encourage stretching there, leaving the areas to be reinforced less stretched.

Air or a purified gas can be used for blowing. It may be cooled to assist in cooling of the blown article.

In the embodiment of FIGS. 14 & 15, the second cavity member can be provided with two secondary cavities. This has particular advantage in the forming of CPET articles, in that their preforms can be moulded at twice the frequency of their ejection from the secondary cavities. One secondary cavity is arranged to pick up and shape a preform and whilst the other has carried its product throughout the advance of the one. This allows time for elevated temperature crystallisation.

What is claimed is:

1. A method of forming a plastics material article comprising the steps of:
   forming an injection moulded preform between a stationary base mould part and a movable substitutable part which together define an initial mould cavity for injection of the preform,
   moving the substitutable mould part after injection of plastics material into the initial mould cavity to leave the preform stationary on the base mould part,
   positioning over the preform in place of the substitutable mould part at least one replacement mould part to define a cavity larger than the initial mould cavity,
   stretching at least part of the preform away from the base mould part against the replacement mould part(s) to form a finished article shape, and
   removing the replacement mould part(s) in order to release the finish formed article,
   wherein the Substitutable Mould Past is separated from the preform after the latter has skinned against it, but before the preform has solidified throughout its thickness, at least in the portion of it to be stretched,
   wherein the method includes injection of gas between it and the Base Mould Part to separate at least part of the preform from the Base Mould Part,
   wherein the stretching of the preform is effected by injection of gas between it and the Base Mould Part,
   wherein the stretching of the preform is effected by lifting a portion of the preform from at least part of a main piece of the Base Mould Part by a movable piece of the Base Mould Part,
   wherein the lifted portion of the preform is moved by the movable piece of the Base Mould Part as far as a corresponding piece of the Replacement Mould Part(s),
   wherein the lifted portion of the preform is captivated between the movable piece of the Base Mould Part and the corresponding piece of the Replacement Mould Part(s) at the end of the stroke of the movable piece, and
   wherein the captivation of the lifted portion of the preform temporarily seals apertures in the lifted portion.

2. A forming method as claimed in claim 1, wherein the injection of gas is started before the movable piece of the Base Mould Part is moved.

3. A forming method as claimed in claim 1, wherein the injection of gas is started before the replacement with the Replacement Mould Part(s) is complete.

4. A forming method as claimed in claim 3, wherein the preform is attached to a main piece of the Base Mould Part by virtue of this piece being polished, at least locally.

5. A forming method as claimed in claim 4, wherein the preform is stretched from a portion of it temporarily captivated by the Replacement Mould Part(s).

6. A forming method as claimed in claim 5, wherein the preform is stretched to substantially the final shape of the finish formed article.

7. A forming method as claimed in claim 6, wherein a stretched portion of the preform is urged into contact with the replacement Mould Part(s) for its final temperature control by application of increased gas pressure on the Base Mould Part side of the preform (which may be from gas applied for lifting and/or stretching of the preform) and/or by application of reduced gas pressure on the Replacement Mould Part(s) side of the preform.

8. A forming method as claimed in claim 7, wherein the enlarged mould cavity is defined by a plurality of Replacement Mould Parts.

9. A forming method as claimed in claim 8, wherein the enlarged mould cavity is assembled by radial movement of the Replacement Mould Parts into their replacement position.

10. A forming method as claimed in claim 8, wherein the enlarged mould cavity is assembled by pivotal movement of the Replacement Mould Parts into their replacement position.

11. A forming as claimed in claim 10, wherein the plurality of Replacement Mould Parts are provided with ducts for temperature control fluid and the article is brought to the temperature required for it to be sufficiently rigid for its removal by passage of temperature control fluid through the ducts after stretching and prior to opening of the Replacement Mould Parts.

12. A forming method as claimed in claim 7, wherein the enlarged mould cavity is defined by a single, or one per impression where the tool has multiple impressions, Replacement Mould Part moved bodily into its replacement position.

13. A forming method as claimed in claim 12, wherein the or each single Replacement Mould part is provided with ducts for temperature control fluid and the article is brought to the temperature required for it to be sufficiently rigid for its removal by passage of temperature control fluid through the ducts after stretching and prior to opening of the Replacement Mould Part(s).

14. A forming method as claimed in claim 12, wherein the single Replacement Mould part is provided with ducts for temperature control fluid and the article is brought to the temperature required for it to be sufficiently rigid for its removal by passage of temperature control fluid through the ducts after stretching and both prior to and after removal of the Replacement Mould Parts.

15. A forming method as claimed in claim 14, wherein the stretched portion of the preform is stretched by between a factor of 2:1 and 4:1.

16. A tool for forming a plastics material article, the tool comprising:
   a stationary base mould part,
   a substitutable mould part for defining in conjunction with the stationary base part an initial mould cavity mounted for axial movement towards and away from the base mould part, an injection gate on the first mould part for controlling injection of plastics material into the initial mould cavity to produce a preform, at least one replacement mould part movably carried by the base mould part of the substitutable mould part for movement from a withdrawn position to an advanced position in which the replacement mould part(s) and the stationary base mould part together provide a cavity of greater volume than the initial mould cavity defining the outside shape of the finish formed article, a movable piece in the base mould part for lifting a portion of the preform from the base mould part, the movable piece being adapted to seal against a main piece of the base mould part during injection moulding of the preform, and a gas connection internally of the main piece and the movable piece of the base mould part for enable gas pressure to be applied to the side of the preform facing the base mould part to stretch the preform on to the replacement mould part(s), the gas passing through an aperture in the main piece that is opened when the movable piece is lifted, wherein the movable piece has a face shaped complementarily with both the opposite face of the Substitutable Mould Part and the Replacement Mould Part(s), whereby the liftable portion of the preform is moulded to final shape in the initial mould cavity.

17. A mould tool as claimed in claim 16, wherein a plurality of Replacement Mould Parts are translationally mounted on the Base Mould Part for movement to form the enlarged cavity and means is provided for moving the Replacement Mould Parts between their withdrawn position and their advanced position.

18. A mould tool as claimed in claim 16, wherein a plurality of Replacement Mould Parts are pivotally mounted on the Base Mould Part for movement to form the enlarged cavity and means is provided for moving the Replacement Mould Parts between their withdrawn position and their advanced position.

19. A mould tool as claimed in claim 18, wherein the means for moving the Replacement Mould Parts includes a slidable member mounted on the Base Mould Part and respective connecting rods connecting the slidable member and the Replacement Mould Parts, the slidable member and the rods being arranged for advance and withdrawal of the Replacement Mould Parts between a withdrawn position in which the Substitutable Mould Part can close on the Base Mould Part and an advanced position in which the Replacement Mould Parts can close on the Base Mould Part.

20. A mould tool as claimed in claim 16, wherein a single, or one per impression where the tool has multiple impressions, Replacement Mould Part is translationally mounted on the Substitutable Mould Part or on the Base Mould Part for bodily movement to provide the enlarged cavity.

21. A mould tool as claimed in claim 20, including a vacuum duct in the Replacement Mould Part extending from an external vacuum connection point to at least one internal vacuum point opening into the enlarged cavity, whereby the finish formed article can be held in the enlarged cavity on withdrawal of the Replacement Mould Part from the Base Mould Part.

22. A mould tool as claimed in claim 21, including:
a first slide and actuator carried on the Substitutable Mould Part or on the Base Mould Part, the slide extending at least substantially radially of a centerline of the mould tool a Replacement Mould Part carrier slidably mounted on the slide under control of the actuator and a second slide and actuator carried on the carrier and extending at least substantially parallel to the centerline of the mould tool, the Replacement Mould Part being mounted on the second slide under control of the second actuator.

23. A mould tool as claimed in claim 22, in combination with a control system adapted and arranged for:
actuation of the first actuator for inwards radial movement of the carrier and Replacement Mould Part after opening of the Substitutable Mould Part to align the Replacement Mould Part with the Base Mould Part and outwards after stretching of the preform, reciprocating actuation of the second actuator for axial movement of the Replacement Mould Part into abutment with the Base Mould Part for stretching of the preform and out of abutment after stretching of the preform.

* * * * *

UNITED STATES PATENT AND TRADEMARK OFFICE
CERTIFICATE OF CORRECTION

PATENT NO. : 6,726,873 B1
DATED : April 27, 2004
INVENTOR(S) : P. Clarke

It is certified that error appears in the above-identified patent and that said Letters Patent is hereby corrected as shown below:

Column 3,
Line 19, after "Part (s)", please change the "," to -- ; --.

Column 5,
Line 2, cancel "Pans" and substitute -- Parts --.

Column 7,
Line 25, please change "fills" to -- falls --.

Column 8,
Line 17, after "reached", please delete "to"; and
Line 34, cancel "stem-to-stein" and substitute -- stem-to-stem -- therefor.

Column 9,
Line 9, please change "slacking" to -- stacking --.

Column 10,
Line 43, please change "pan" to -- part --.

Signed and Sealed this

Sixteenth Day of November, 2004

JON W. DUDAS
*Director of the United States Patent and Trademark Office*